United States Patent
Challa et al.

(10) Patent No.: US 11,580,012 B2
(45) Date of Patent: Feb. 14, 2023

(54) SMART TEST CASE GENERATOR

(71) Applicant: Accenture Global Solutions Limited, Dublin (IE)

(72) Inventors: Rajitha Challa, Hyderabad (IN); Ravi Chandra Babu Sivakala, Hyderabad (IN); Bheeshan Kumar Reddy Vallela, Hyderabad (IN); Neeraj Puri, Hyderabad (IN); Aditya Yellapantula, Hyderabad (IN); Naresh Reddy Yempalla, Hyderabad (IN); Aditya Akella, Hyderabad (IN); Ajay G. Gupta, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 163 days.

(21) Appl. No.: 16/923,073

(22) Filed: Jul. 7, 2020

(65) Prior Publication Data
US 2022/0012168 A1  Jan. 13, 2022

(51) Int. Cl.
*G06F 11/36* (2006.01)
*G06F 8/34* (2018.01)

(52) U.S. Cl.
CPC ...... *G06F 11/3684* (2013.01); *G06F 11/3664* (2013.01); *G06F 11/3688* (2013.01); *G06F 8/34* (2013.01)

(58) Field of Classification Search
CPC .................. G06F 11/36–3696; G06F 8/34–35
See application file for complete search history.

(56) References Cited

U.S. PATENT DOCUMENTS 7,975,296 B2 * 7/2011 Apfelbaum ........... G06F 21/577
  726/25
8,578,346 B2 * 11/2013 Chao ................... G06F 11/3604
  717/132

(Continued)

OTHER PUBLICATIONS

"Integrating BPM Tools Like Microsoft Visio® with Zephyr® on JIRA® Cloud," https://www.businessprocessincubator.com/content/integrating-bpm-tools-like-microsoft-visio-with-zephyr-on-jira-cloud-2/, last accessed Apr. 16, 2020, 4 pages.

(Continued)

*Primary Examiner* — Todd Aguilera
(74) *Attorney, Agent, or Firm* — Norton Rose Fulbright US LLP (57) ABSTRACT

Embodiments provide systems, methods, and computer-readable storage media for automated and objective testing of applications or processes. Graphical representations of the application may be analyzed to derive attribute data and identify flows (e.g., possible processing paths that may be accessed during utilization of the application by a user). Test cases may be automatically generated based on the attribute data and the identified flows. Additionally, testing scripts for testing the portions of the application corresponding to each identified flow may be generated using machine learning logic. Once generated, the testing scripts may be executed against the application to test different portions of the application functionality (or processes). Execution of the testing scripts may be monitored to generate feedback used to train the machine learning logic. Reports may be generated based on the monitoring and provided to users to enable the users to resolve any errors encountered during the testing.

20 Claims, 4 Drawing Sheets

(56) References Cited

U.S. PATENT DOCUMENTS

| | | | |
|---|---|---|---|
| 11,003,568 B2* | 5/2021 | Smith | G06F 11/366 |
| 2012/0066662 A1* | 3/2012 | Chao | G06Q 10/06 |
| | | | 717/104 |
| 2018/0018590 A1* | 1/2018 | Szeto | G16H 40/20 |
| 2018/0144276 A1 | 5/2018 | Neravati | |
| 2019/0294990 A1* | 9/2019 | Lopez De Prado | G06F 17/153 |
| 2019/0370613 A1* | 12/2019 | Arngren | G06N 20/10 |
| 2020/0097389 A1* | 3/2020 | Smith | G06F 11/3612 |
| 2020/0401505 A1* | 12/2020 | Chenguttuvan | G06F 11/3684 |
| 2021/0382816 A1* | 12/2021 | Chapagain | G06F 11/3688 |

OTHER PUBLICATIONS

Excerpts from "Webcast Kataion Studio Linked with Microsoft Visio for BDD and Model-based Testing," https://www.youtube.com/watch?v=78hN6BF0k0U, last accessed Apr. 16, 2020, 1 page.

Yotyawilai, P. et al., "Design of a Tool for Generating Test Cases from BPMN," International Conference on Data and Software Engineering (ICODSE), Nov. 27, 2014, 6 pages.

Lasch de Moura, J. et al., "Test Case Generation from BPMN Models for Automated Testing of Web-Based BPM Applications," 17th International Conference on Computational Science and its Applications (ICCSA), Jul. 6, 2017, 7 pages.

Alhroob, A. et al., "Automatic Test Case Generation from Software Specifications," e-Informatica Software Engineering Journal, vol. 4, No. 1, Dec. 2010, 13 pages.

Carvalho, G. et al., "NAT2TEST$_{scr}$: Test case generation from natural language requirements based on SCR specifications," Science of Computer Programming, vol. 95, 2014, pp. 275-297.

Wang, C. et al., "Automatic Generation of System Test Cases from Use Case Specifications: an NLP-based Approach," UMTG, Jul. 19, 2019, 27 pages.

"Smart Visio4DevOps," https://www.modernrequirements.com/smart-visio4devops/, last accessed Jul. 7, 2020, 2 pages.

* cited by examiner

SMART TEST CASE GENERATOR

TECHNICAL FIELD

The present application relates to testing of software and more specifically to systems and methods for automatic testing of applications.

BACKGROUND

Testing plays an important role in the successful deployment of applications. While there are many tools to aid in testing of applications, current techniques often rely on subjective techniques that involve a user manually reviewing a description of the application to identify potential use cases that should be tested and then manually creating tests designed to test the application for the identified use cases. Due to the subjective nature of this process, current testing methods are very time consuming and may result in some test cases being missed. As an example of the time consuming nature of existing processes, as many as 3,500 hours may be spent annually testing a single application involving complex test cases. Many of these complex test cases can include more than 60 different flows (e.g., possible ways in which the functionality of the application is accessed and executed) and in such instances it is easy for a user to overlook some flows or portions of the use case(s). Such errors result in incomplete testing with no simple way to identify that an error in the test design has occurred. Accordingly, presently available testing techniques suffer from many drawbacks.

SUMMARY

The present application discloses systems, methods, and computer-readable storage media for automated and objective testing of applications or processes. Often, during the design of an initial or new release of an application, a graphical representations of the application may be constructed. The graphical representation may identify various functional features of the application, how the functional features of the application are related (e.g., whether outputs of one functional feature are provided as inputs to another functional feature, etc.) and may provide a way to visualize how data is processed by the application. According to embodiments, a graphical representation of an application may be automatically transformed into a set of test cases and one or more machine-readable testing scripts that may be used to test the application.

Once the graphical representation is generated, it may be provided to a testing device. The testing device may analyze the graphical representation to derive attribute data and identify flows (e.g., possible processing paths that may be accessed during utilization of the application by a user). Test cases (e.g., human readable descriptions of the flows) may be automatically generated based on the attribute data and the identified flows. Additionally, testing scripts for testing the portions of the application corresponding to each identified flow may be generated using machine learning logic. For example, the machine learning logic may be executed against the attribute data and an identified flow to map a dataset to the processing flow. The testing script may be generated based on the mapping. For example, the dataset may identify functions provided during execution of the processing flow, data expected by one or more of the functions, and other information that may be used to generate the testing script.

Once generated, the testing scripts may be executed against the application to test different portions of the application functionality (or processes). For example, a web-based application may be tested by embodiments via execution of testing scripts executable by a web browser. The testing scripts may be configured to simulate user interaction with the web-based application, such as to click links to navigate to different pages of the application interface, provide inputs to one or more data fields of the application, and the like. In aspects, third party tools, such as SELENIUM, may be used to execute testing scripts against the application in a run-time type environment.

Execution of the testing scripts may be monitored to generate data that may be stored in a database. The data may indicate the results of the testing, such as to indicate whether the testing caused any errors or was completed successfully. The data obtained via the monitoring may be used to train the machine learning logic, which may improve the manner in which testing scripts are generated in the future and improve the accuracy of the testing. Additionally, the data may be used to generate reports that may be provided to users, such as individuals that are responsible for building and maintaining the application, to enable the users to resolve any errors encountered during the testing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Techniques for leveraging machine learning logic to automate generation of machine-readable testing scripts for applications are disclosed. In embodiments, a specification that includes a graphical representation of an application or process is received and transformed into a set of test cases and testing scripts. The graphical representation may include shapes corresponding to functional features of the application and connectors that connect the different shapes to each other. The graphical representation may be analyzed to identify processing flows for testing. Additionally, the graphical representation may be analyzed to extract attribute data for the processing flows. A set of test cases (e.g., human readable descriptions of the processing flows) may be automatically generated and machine learning logic may be used to automatically generate testing scripts for testing the scenarios associated with the different test cases. Once generated, the testing scripts may be executed against the application to test particular processing flows. As will become apparent from the description below, the objective processes disclosed herein for testing applications overcome many of the drawbacks associated with existing testing processes and technologies.

Figure 1:
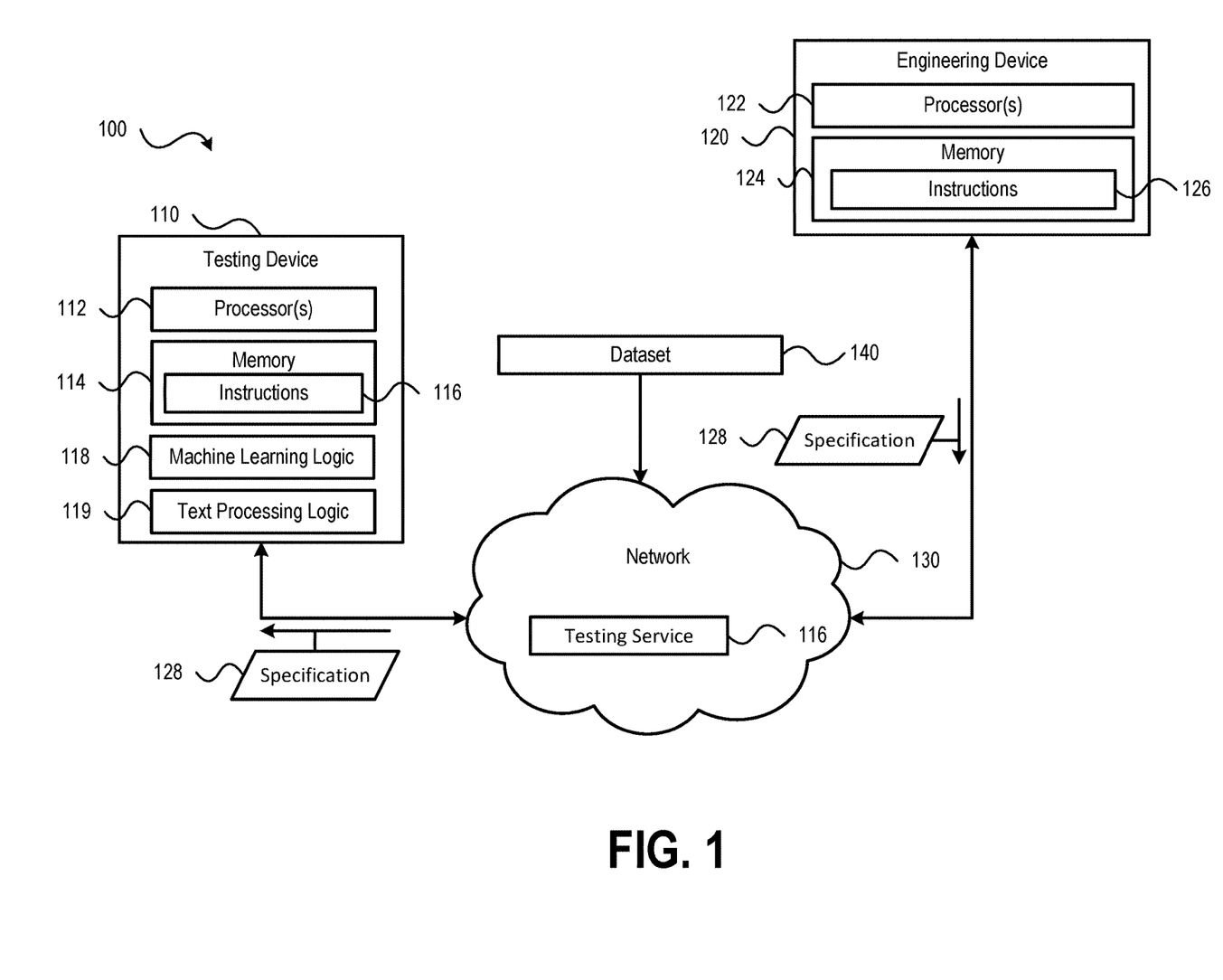
FIG. 1 is a block diagram illustrating a system for testing a process in accordance with aspects of the present disclosure.

Referring to FIG. 1, a block diagram illustrating a system for testing a process in accordance with aspects of the present disclosure is shown as a system 100. As illustrated in FIG. 1, the system 100 includes a testing device 110 that is communicatively coupled to an engineering device 120 via one or more networks 130. The system 100, and more particularly the testing device 110, may be configured to automatically generate testing data based on a graphical representation of a process (e.g., an application) and then test the process based on the testing data. It is noted that while the system 100 is primarily described with reference to physical devices (e.g., the testing device 110), such description is provided for purposes of illustrating the concepts disclosed herein and embodiments are not implementations involving physical devices (e.g., servers, etc.). For example, the functionality and operations of the testing device 110 may be provided in a cloud-based implementation, as indicated by testing service 116, or the testing device 110 may operate as a web server and the functionality described in connection with the testing device 110 may be provided a web-based testing service accessible to users via a web browser or other internet enabled application.

As shown in FIG. 1, the testing device 110 may include one or more processors 112, a memory 114, machine learning logic 118, and text processing logic 119. Each of the one or more processors 112 may be a central processing unit (CPU) or other computing circuitry (e.g., a microcontroller, one or more application specific integrated circuits (ASICs), and the like) and may have one or more processing cores. The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the one or more processors 112, cause the one or more processors 112 to perform the operations described in connection with the testing device 110 with reference to FIGS. 1-4. The machine learning logic 118 may comprise logic to analyze mapping data generated by the testing device 110 and produce feedback data that may be used to improve creation of testing data for testing a process, as described in more detail below. The text processing logic 119 may be configured to perform various natural language processes to analyze information included in specifications providing a graphical representation of a process, as described in more detail below.

The engineering device 120 may be a device (e.g., a server, a desktop computing device, a laptop computing device, a tablet computing device, or other device) or collection devices used to generate a specification 128 of a process. The specification 128 may include a graphical representation of the process. For example, the specification 128 may be a process diagram that graphically represents various flows that a process may take as the process executes.

Figure 2:
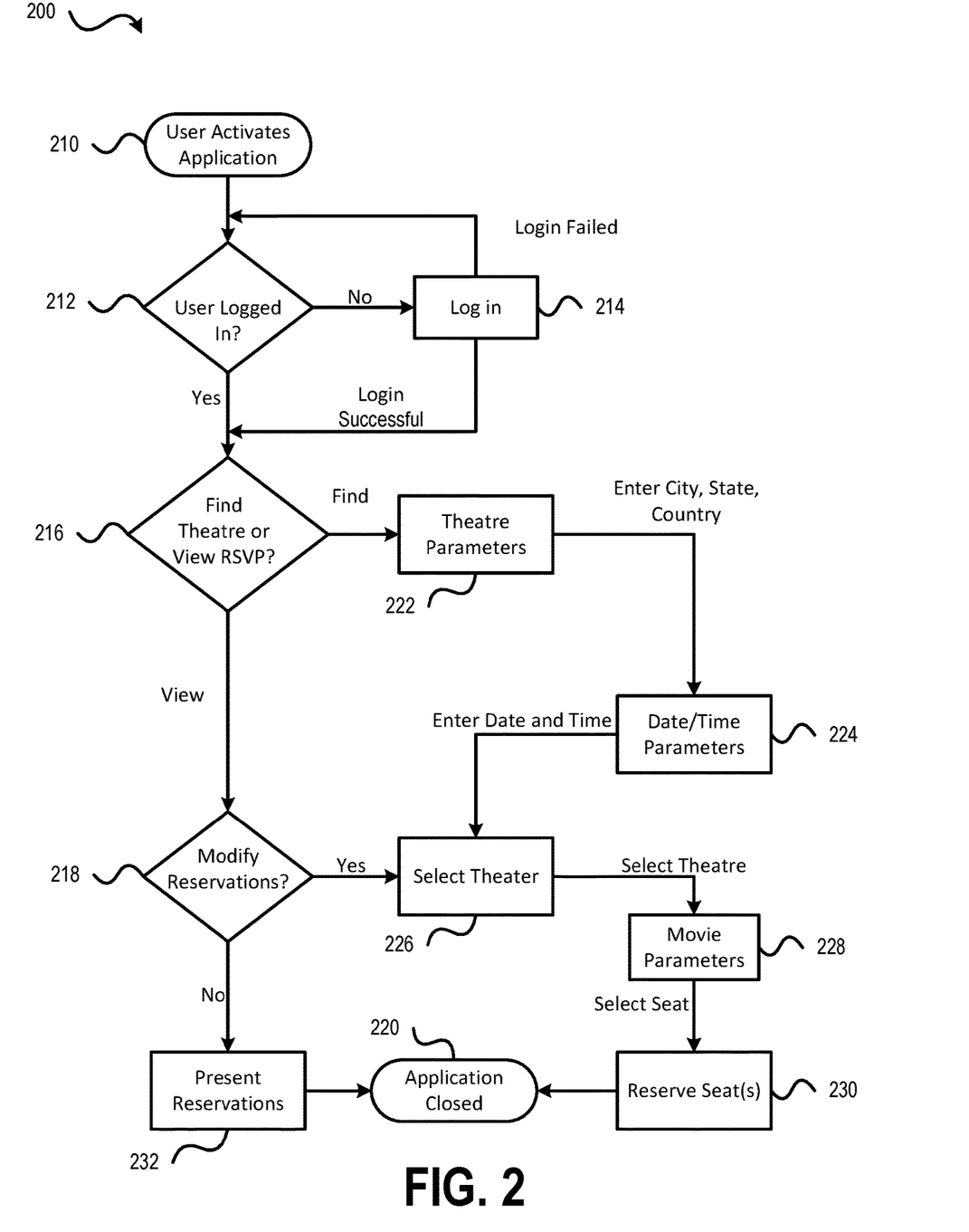
FIG. 2 is a block diagram of an exemplary graphical representation of an application according to aspects of the present disclosure.

For example and referring to FIG. 2, a block diagram of an exemplary graphical representation of an application according to aspects of the present disclosure is shown as a specification 200. The exemplary specification 200 illustrated in FIG. 2 illustrates a specification of a process for interacting with a system for reserving tickets to a movie theatre using an Internet-enabled application, such as a mobile application or a web browser application. The process illustrated by the specification 200 may begin at start block 210 when a user activates the application. At decision block 212, the application may determine whether the user is logged in (e.g., some mobile applications and browser applications allow the user to remain logged in for a period of time despite not actively using the application). If the user is not logged in, the process proceeds to block 214, where the process presents the user with functionality for logging in to the application, such as by entering a user name and password, biometric information (e.g., facial recognition, fingerprint scan, or other biometric information). If the login process fails the process may proceed back to decision block 212, which may determine that the user is not logged in and processing may then proceed back to block 214 and the user may attempt the login process again.

Once logged in, the process may proceed to decision block 216, which may provide functionality for allowing the user select an option to find a theatre or view existing reservations. If the user selects the option to view existing reservations the process may proceed to block 218, allowing the user to modify the reservation. If the user chooses not to modify the reservations, the process may proceed to block 232, where the reservations of the user are presented by the application. Once the user has completed viewing the reservations the user may close the application, which causes the process to proceed to end process block 220.

If the user selects, in block 216, to find a theatre, the process may proceed to block 222 where the user may be prompted to provide search parameters, such as the city, state, country, zip code, or other types of data that may be used to locate a theatre. Once the parameters are located the functionality provided the process proceeds to block 224, where the user is prompted to configure date and time parameters, which may indicate the day and time when the user would like to watch a movie. Once the parameters at blocks 222 and 224 have been configured, the process proceeds to block 226, where the user is prompted to select a theatre (e.g., one of the theatres identified based on the theatre parameters configured at block 222. After theatre selection is complete, the process may proceed to block 228 where the user may configure one or more movie parameters (e.g., select a movie, seats, and the like). Once the move parameters are configured the process proceeds to block 230, where the user provides information for reserving one or more seats for the selected movie. Such processing may include processing credit card information, gift card information, or other types of payment information that may be used to pay for the seat(s) selected by the user. Upon successful reservation of the seat(s), the process may end at end block 220.

Other processing flows are also provided in the specification 200. For example, if the user is already logged in to the application, decision block 212 may proceed to block 216 and block 214 may be bypassed. Additionally, if the user selects, in decision block 218, to modify an existing reservation the process may proceed from block 216 to block 226, rather than proceed to block 232. It is noted that the exemplary specification illustrated in FIG. 2 is provided for purposes of illustrating concepts related to how a process may be represented graphically and is not intended to be limiting. In many real-life examples the concepts of the present disclosure will be applied to processes that are much more complex, often involving a much larger number of flows (e.g., possible paths through which functionality of the process may be activated or utilized). For example, many processes may include 50 or more use cases and 90% or more of the use cases may be complex use cases having 60 or more flows. Such processes may require hundreds of test cases (for each complex use case) to be created and tested to verify the specification is correct prior to implementation of the process (e.g., in code and/or hardware).

Referring back to FIG. 1, the engineering device 120 may include one or more processors 122 and a memory 124. Each of the one or more processors 122 may be a CPU or other computing circuitry (e.g., a microcontroller, one or more ASICs, and the like) and may have one or more processing cores. The memory 124 may include ROM devices, RAM devices, one or more HDDs, flash memory devices, SSDs, other devices configured to store data in a persistent or non-persistent state, or a combination of different memory devices. The memory 124 may store instructions 126 that, when executed by the one or more processors 122, cause the one or more processors 122 to perform the operations described in connection with the engineering device 110 with reference to FIGS. 1-4.

The engineering device 120 may be configured to provide functionality for designing and implementing processes in software and hardware. The engineering device 120 may provide tools that a user or users may utilize to generate the specification 128. One such tool is MICROSOFT VISIO®, which allows users to create process diagrams. The engineering device 120 may enable a software designer, a hardware designer, or team of software or hardware designers to generate process specifications that detail how software and/or hardware are to operate once created. The specifications created by the engineering device 120, such as the specification 128, may include graphical representations of the operations of the process designed users of the engineering device 120, such as the graphical representation 200 of FIG. 2. As briefly described above, the specification 128 may be provided to the testing device 110 via the one or more networks. After receiving the specification 128, the testing device 110 may initiate various operations configured to generate testing data for testing the process or processes corresponding to the specification 128. It is noted that the specifications created using engineering device 120 are in a human readable form (e.g., a Visio flow diagram, text, etc.) and that the testing device may transform the human readable information into a machine readable form to perform testing, as described in more detail below.

Figure 3:
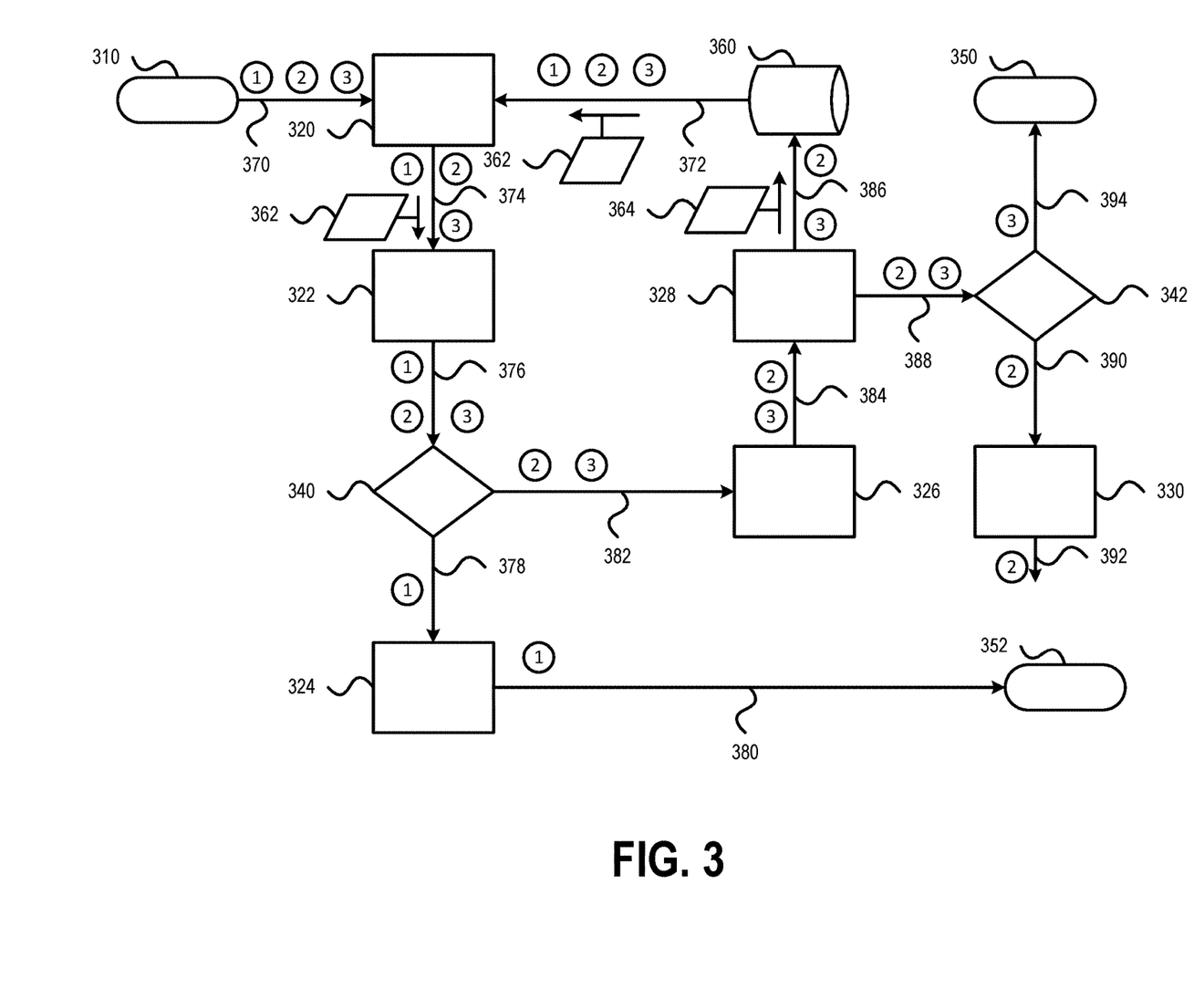
FIG. 3 is a block diagram illustrating aspects of extracting attribute data in accordance with aspects of the present disclosure.

To generate the testing data, the testing device 110 may analyze the graphical representation of the process included in the specification 128 and extract attribute data from the graphical representation. The attribute data may include shape information and connector information. The shape information may include information that identifies the different shapes included in the graphical representation and the connector information may identify connectors within the graphical representation. Referring briefly to FIG. 3, a block diagram illustrating aspects of extracting attribute data in accordance with aspects of the present disclosure is shown. In FIG. 3, a graphical representation of a process is illustrated and includes start block 310, functional blocks 320, 322, 324, 326, 328, 330, decision blocks 340, 342, end blocks 350, 352, data management block 360, and a plurality of connectors 370, 372, 374, 376, 378, 380, 382, 384, 386, 388, 390, 392, 394. The data management block 360 may represent a database or other type of data storage (e.g., a blockchain, etc.) from which data may be retrieved for use in the process, such as data 362 retrieved from the data management block 360, and to which data may be written during the process, such as data 364 written to the data management block 360 by the functional block 328.

Each of the different functional blocks 320, 322, 324, 326, 328, 330 may be associated with functionality of the process and the decision making blocks 340, 342 may be associated with determinations as to how an execution of the process traverses various processing paths that are possible within the graphical representation of the process. For example, decision block 340 may represent a decision to be made within the process and based on the outcome of the decision execution of the process is routed to functional block 324 or functional block 326. Similarly, decision block 342 routes execution of the process to end block 350 or functional block 330.

During the analysis of the specification (e.g., the specification 128), the testing device 110 may identify the different shapes and the connectors, as well as the relationships between the shapes and the connectors (e.g., what shapes are connected by the connectors). For example, the attribute data for the specification illustrated in FIG. 3 may indicate that block 310 is the start block; the start block 310 is connected to the functional block 320 via connector 370; functional block 320 is connected to data management block 360 via connector 372; functional block 320 is connected to functional block 322 by connector 374; functional block 322 is connected to decision block 340 by connector 376; decision block 340 is connected to functional block 324 by connector 378 and to functional block 326 by connector 382; functional block 324 is connected to end block 352 via connector 380; functional block 326 is connected to functional block 328 via connector 384; functional block 328 is connected to decision block 342 via connector 388; functional block 328 is connected to data management block 360 via connector 386; decision block 342 is connected to functional block 330 via connector 390 and end block 350 via connector 394; functional block 330 is connected to a first end of connector 392 but the second end of the connector 392 is not coupled to anything else. In an aspect, the attribute data indicating the connections and relationships between the shapes of the graphical representation may be written to a connector file.

In an aspect, the attribute data may be derived by analyzing the specification 128 and then creating a new copy of the specification that includes metadata corresponding to the different flows. For example, the specification 128, as received from the engineering device 110, may simply be a graphical representation of a process or application. The testing device 110 may identify the shapes and connectors within the specification 128 and copy those connectors or shapes to a new instance of the specification. In doing so, the new copy of the specification may be created with attributes and metadata that may be used to identify flows within the process, such as metadata that identifies the connections between the shapes and possible ways in which execution of the illustrated process(es) may be performed. The attributes (e.g., individual block, shape, connector information, etc.) and the metadata (e.g., the document name, tab name (for different diagrams within the specification), etc.), may be extracted from the specification using one or more macros. This metadata may then be used to identify flows within the process. Additional exemplary aspects of identifying flows are described elsewhere herein.

In an aspect, one or more validation operations may be performed during the analysis of the specification 128. For example, the specification may be analyzed to verify that each end of the connectors is connected to at least one shape. If a connector is identified as having at least one end that is not connected to a shape, the specification may be flagged as including an error. For example, in FIG. 3, an error may be identified because connector 392 is connected to functional block 330 on a first end but the second end of connector 392 is not connected to a shape. It is noted that in some aspects, connectors may be connected to shapes other than functional blocks, decision blocks, start/end blocks. For example, the graphical representation in FIG. 2 illustrates connectors that are connected to other connectors (e.g., the connectors leading from block 214). Errors may also be identified during the validating when a functional block, a start or end block, or a decision block is not connected to any other shapes or connectors.

An error message may be generated when an error is found in the specification. For example, the error message may indicate the shape(s) associated with errors, such as to indicate that one end of the connector 392 is not connected to a shape. The error message may be provided to a user, such as via an e-mail message, a pop-up message in a testing application or a web browser application, a short messaging service (SMS) message, or other type of message to notify the user that an error has been found in the specification. The error message may include information that identifies the error(s) found in the specification, such as to indicate that the connector 392 is not connected to a second shape. In an additional or alternative aspect, the error may be recorded to an error log and the error log may be provided to or otherwise made accessible to one or more users to allow the users to learn of errors in the specification. For example, the error message may be transmitted to a user associated with an engineering device (e.g., the engineering device 120 of FIG. 1) to notify the user of errors and the user may correct the errors and resubmit the specification for processing by a testing device (e.g., the testing device 110 of FIG. 1). In some aspects, the error may be recorded to the error log and the error message may be transmitted to notify the user of the error, which may be viewed by the user in more detail by accessing the error log.

After the attribute data has been identified, the specification may be analyzed to identify one or more flows within the process represented by the graphical representation. The different processing paths or flows may represent different possible ways in which the functionality of the process illustrated by the graphical representation may be accessed and executed. For example, three flows may be identified in the graphical representation illustrated in FIG. 3, which are indicated by numbers inside circles. A first flow, indicated by a 1 inside a circle, starts at start block 310 and traverses a processing path that includes functional blocks 320, 322, 324, decision block 340, end block 352, and data management block 360. The various types of blocks included in the first flow are connected by a set of connectors that includes connectors 370, 372, 374, 376, 378, 380. A second flow, indicated by a 2 inside a circle, starts at start block 310 and traverses a processing path that includes functional blocks 320, 322, 326, 328, 330, decision blocks 340, 342, and data management block 360. The various types of blocks included in the second flow are connected by a set of connectors that includes connectors 370, 372, 374, 376, 382, 384, 386, 388, 390, and 392. A third flow, indicated by a 3 inside a circle, starts at start block 310 and traverses a processing path that includes functional blocks 320, 322, 326, 328, decision blocks 340, 342, data management block 360, and end block 350. The various types of blocks included in the second flow are connected by a set of connectors that includes connectors 370, 372, 374, 376, 382, 384, 386, 388, and 394. The three different flows identified in the specification may represent different paths that the process illustrated by the graphical representation shown in FIG. 3 may take depending on the operation performed by the different functional and decision blocks. For example, decision block 340 may determine whether the first processing path or the second and third processing paths are taken (e.g., up to decision block 342) while decision block 342 may determine whether the second or third processing path is taken. In an aspect, identifying flows may include determining whether any flows form infinite or continuous loops (i.e., the flow does not terminate and follows a processing path that traverses a set of shapes (e.g., functional blocks, decision blocks, etc.) that repeats. When a flow is identified as including an error, an error message may be generated similar to the error messages described above. In an aspect, the different processing paths corresponding to the different flows of the process may be identified and validated using tree sort and bubble sort algorithms. As an illustrative example, a tree sort algorithm may be utilized to traverse through every individual valid business flow in the specification and a bubble sort algorithm may be used to sort the formulated business flows in the order they occur within the specification.

In an aspect, the identified flows may be written to one or more files, which may include human readable information for each flow. In an aspect, the one or more files may include a MICROSOFT EXCEL® file or another type of file. Exemplary aspects of information written to a file for the flows illustrated in FIG. 2 is provided in table 1 below:

TABLE 1

| Use Case | Test Case # | Description | Prerequisite Conditions | Step # | User Input Type | User Input | Expected Result |
|---|---|---|---|---|---|---|---|
| Ticket_booking | Theatre_Booking_TC1 | Is the user logged in? No; Yes Flow: A > Yes | 1. Is the user logged in? No | 1 | #UserEnteredText | User visits the Site | A. Log in |
| | | | | 2 | #NoUserAction | Success | Yes |
| Ticket_booking | Theatre_Booking_TC2 | Is the user logged in? Yes; Find a theater or view reservations Find; User exits the SiteFlow: B > C > D > E > F > User exits the Site | 1. Is the user logged in? Yes 2. Find a theater or view reservations Find | 1 | #UserEnteredText | User visits the Site | B. Enter City, State and Country |
| | | | | 2 | #UserEnteredText | Enter City, State, Country Details | C. Enter date and time to check availability |
| | | | | 3 | #UserEnteredText | Enter Date and Time | D. Select theater and rate |
| | | | | 4 | #UserSelectedButton | Select Theatre | E. Select seat location |
| | | | | 5 | #UserSelectedButton | Select Seat | F. Reserve with credit card |
| | | | | 6 | #UserSelectedButton | Yes | User exits the Site (application closed) |
| Ticket_booking | Theatre_Booking_TC3 | Is the user logged in? Yes; Find a theater or view reservations View; Modify reservation? No; User exits the Site Flow: User exits the Site | 1. Is the user logged in? Yes 2. Find a theater or view reservations View 3. Modify reservations? No | 1 | #UserEnteredText | User visits the Site | User exits the Site (application closed) |
| Ticket_booking | Theatre_Booking_TC4 | Is the user logged in? Yes; Find a theater or view reservations View; Modify reservations? Yes; User exits the Site (application closed) Flow: D > E > F > User exits the Site | 1. Is the user logged in? Yes 2. Find a theater or view reservations View 3. Modify reservations? Yes | 1 | #UserEnteredText | User visits the Site | D. Select theater and rate |
| | | | | 2 | #UserSelectedButton | Select Theatre | E. Select seat location |
| | | | | 3 | #UserSelectedButton | Select Seat | F. Reserve with credit card |
| | | | | 4 | #UserSelectedButton | Yes | User exits the Site (application closed) |

It is noted that notations for the "Flow:" values shown in the Description column of Table 1 include references to A, B, C, D, E, and F, where "A" corresponds to block 214 of FIG. 2, "B" corresponds to block 222 of FIG. 2, "C" corresponds to block 224 of FIG. 2, "D" corresponds to block 226 of FIG. 2, "E" corresponds to block 228 of FIG. 2, and "F" corresponds to block 230 of FIG. 2. Moreover, a reference in Table 1 to "Flow: D>E>F" may represent a processing flow that traverses through blocks 226, 228, and 230 of FIG. 2. It is noted that the exemplary contents of Table 1 are provided for purposes of illustration, rather than by way of limitation and that other types of information (e.g., different columns or data within rows) may be generated for use cases according to embodiments of the present disclosure. Accordingly, Table 1 is to be understood as a non-limiting example of human readable information associated with identified flows within a specification according to aspects of the present disclosure.

Referring back to FIG. 1, once the attributes and the different processing paths are identified, the text processing logic may analyze the attributes and derived flows and generate testing data for testing the process represented by the graphical representation included in the specification 128. The testing data may include test cases generated based on the flows. For example, a test case may be created for each flow (e.g., each processing path starting from the start block and terminating at an end block). In an aspect, decision blocks may be used to formulate the test step(s) and identify the user actions and/or user action types (e.g., click, enter text, no user action, etc.) for each processing flow. At least a portion of the testing data may be generated in a human readable format. Generating the testing data may also include generating test data, which may include expected results, based on the identified flows of the process. In an aspect, the specification may include some text data that may be analyzed to generate the testing data. To illustrate, in FIG. 2, the various connectors include text data that indicates the types of inputs or outputs that may be obtained by the various illustrated blocks (e.g., decision block 212 follows a path to block 214 if the determination of whether the user is logged in is "No" and follows a path to decision block 216 if the determination of whether the user is logged in is "Yes").

One benefit of generating human readable test case data is that users may be allowed to review the test cases before or after additional testing operations are performed. For example, once the test cases are identified and the written one or more files, a user may be prompted with an option to review the automatically generated test cases. The user may review the one or more files and correct any errors or issues that are identified. If no errors are found or the user declines to review the test case file(s), additional testing data may be generated. It is noted that in some cases the additional testing data may be generated before the user indicates whether the test cases contain any errors or has reviewed the one or more files, but since the testing device 110 is capable of automatically generating the additional testing data from the one or more files and other data derived by the testing device (e.g., as described above), regenerating the additional testing data once the user has reviewed the one or more files may not present a significant delay as compared to when all testing data is created using the subjective techniques that are presently available.

As part of the process of generating the testing data, the testing device 110 may analyze metadata derived from the processes above, such as the attributes, keywords found in the specification or derived from analysis of the flows, etc., and generate test scripts that may be run to test the functionality of the process represented by the specification 128. The test scripts may be generated by mapping a set of functions, data, and keywords to the flows identified within the specification 128. For example, a dataset 140 may be accessible to the testing device 110. It is noted that the dataset 140 may be stored at the memory 114 of the testing device 110, the memory 124 of the engineering device 120, or may be stored in another location accessible to the testing device 110 and/or the engineering device 120. The dataset 140 may include information that identifies a set of functions, data values, and keywords. To illustrate, the application under test may be a web-based application accessible via a web browser and the web-based application may include various functions (e.g., the set of functions), such as functions that enable a user to access and interact with various functionality and features provided by the web-based application. The data values included in the test dataset 140 may include various test values that may be used to simulate user interaction with the application, and the keywords may be used to identify various portions of the application.

As a non-limiting and illustrative example, the application may include a login screen associated with a function to determine whether a user logged in or not (e.g., block 212 of FIG. 2) and a function that allows the user to enter login credentials (e.g., block 214 of FIG. 2). Each of the functions of the application may be associated with a keyword and the data values may include values that a user may provide when interacting with the application, such as values associated with access credentials that may be used to test the functions of the login screen. The testing device 110 may generate mapping data that may be used to generate machine-readable testing scripts that can be executed in a web browser (or other computing environment) to simulate user interaction with the application. The mapping data may map the functions, data values, and keywords of the dataset 140 to the various test cases derived from the identified flows. For example, a test case traversing the processing path that includes blocks 214, 216, 222, 224, 226, 228, 230 of FIG. 2 may result in generation of a test script that navigates to the login screen of the application, locates the login function based on a keyword associated with the login, and provides the access credentials in appropriate data entry fields to simulate a user logging into the application. Other portions of the test script covering that test case may include additional function/data simulation based on mapping of keywords and data values to functionality associated with other portions of the flow corresponding to the test case, such as functionality and data values for blocks 216, 222, 224, 226, 228, 230. The portions of the test script corresponding to these other blocks may simulate user interaction with these other functionalities of the application to allow the processing path (or flow) corresponding to the test case to be fully tested in an online environment (e.g., via the testing scripts running in a web browser).

Once generated, the testing scripts may be made available for review by users. For example, the testing scripts may be stored in the memory 114 and the user may access them via a graphical user interface, which may be an interface provided by a browser-based application or another type of application. The user may review the testing scripts to verify there are no errors or for other purposes. If errors or other issues are identified the user may make modifications to the testing scripts and the changes may be stored for subsequent execution (e.g., during testing). If a user performs the review process, which is optional, the user may validate and/or update the mapping(s) with respect to one or more keyword(s), data, and function(s). Additionally, the user may select and/or de-select test scenarios based on a regression strategy for execution (e.g., in SELENIUM or another testing framework). When the user validates and/or updates the mappings, the user modifications or confirmations with respect to the mappings may be used as feedback to improve future mappings, such as by using the user modifications as training data.

In an aspect, testing scripts may be generated for a subset of identified flows. For example, applications often undergo multiple releases over a period of time (e.g., a year), where each new release includes new functionality, changes to existing functionality, and some previously implemented functionality that is unchanged. The testing device 110 may be configured to generate testing scripts only for flows involving new functionality, which may include flows that have newly implemented functionality (e.g., functionality that was not present a previous release in any form) as well as flows that have modified functionality (e.g., functionality that has been modified in some manner since a previous release). Generation of testing scripts for only flows that have new or modified functionality may reduce the total number of scripts that need to be generated, thereby reducing the computational complexity of the testing process and the computational resources required to complete the testing process. It is noted that although the testing device 110 may be configured with capabilities to generate testing scripts for new or modified flow functionality, in some aspects the testing device 110 may generate testing scripts for all flows regardless of whether some of those flows have the same functionality and that functionality has been previously tested. Performing testing in this manner may help identify potential issues or errors that may have been inadvertently introduced when implementing the new functionality, such as changing a parameter name that is used by a new function as well as a previous function.

Referring briefly back to FIG. 2, a non-limiting an illustrative example of the concepts described above is now provided. The process or application illustrated in FIG. 2 may result in 4 scenarios to be tested: 1. verify the login functionality; 2. verify the logged in user finds a theatre, selects a seat, date and time, and reserves the seat, and exits the application; 3. verify the logged in user views existing reservation, does not want to modify the details, and exits application; and 4. verify the logged in user views an existing reservation, wants to modify the theatre, date, time, and/or seat, and exits application. Each of these scenarios may be converted into a test case for which testing scripts may be created.

Generating testing scripts for the 4 scenarios described above may result in testing scripts that access the application illustrated in FIG. 2 and test whether a user is able to log in to the application (e.g., scenario 1), test whether the user is able to, once logged in, utilize the functionality represented by decision block 216 and functional blocks 222, 224, 226, 228, 230 to create a reservation (e.g., scenario 2), test whether the user is able to, once logged in, utilize the functionality represented by decision blocks 216, 218 an functional block 232 to view existing reservations (e.g., scenario 3); and test whether the user is able to, once logged in, utilize the functionality represented by decision blocks 216, 218 an functional blocks 226, 228, 230 to modify an existing reservation (e.g., scenario 4).

In an aspect, one or more templates may be used to configure portions of the testing data generated by the testing device 110. The one or more templates files may include a test case template file that may be used to describe identified test cases. In an non-limiting example, the test case template file may be specified as follows:

Use Case
Test Case #
Test Case Description
Test Case Prerequisite Conditions
Step Number #
User Input Type
User Input
Expected Result The "Use Case" field may correspond to a field for the name of the use case the test cases (e.g., one of the scenarios described above). The "Test Case No #" may be a field associated with a unique identifier assigned to each test case. The "Test Case Description" may correspond to a field for providing a brief explanation of the test scenario. The "Test Case Prerequisite Conditions" field may be used to specify conditions that need to be met before executing the test case. The "Step Number #" may specify a sequence of test steps in detail and the order the steps are to be executed. The "User Input Type" may be used to specify the type(s) of input needed for executing test case and the "User Input" field may specify inputs to be given by the user while executing the test case. The "Expected Result" field may specify an expected result once the test cases is executed.

Another template, referred to as an action template, may also be utilized. The actions template may be used to specify possible actions that may occur during the process. An exemplary format for the actions template may be:

UserEnteredText|Authenticated, Invalid, Response
NoUserAction|success, failure, timeout
UserSelectedButton|Yes, No In the example actions template above, the delimiter "|" may be used to tie the specified actions to an attribute. For example, the testing data may associate "#UserEnteredText" with the "User Input Type" from the test case header file, which may indicate that the values such as "Authenticated, Invalid, Response" are possible values that may be received for the action (e.g., #UserEnteredText). To illustrate, attribute(s) (e.g., connector information, etc.) obtained from the specification may be passed to the testing process and used to identify one or more associated user actions from a "User Actions Configuration File" based on the "User Input Type" in the test case header file.

In the example above, test cases for each of the 4 scenarios may result in 4 different use cases, each having a unique identifier (e.g., "Test Case #"). The description of the use cases (e.g., "Test Case Description") may describe the use case being tested. For example, the description for the test case associated with scenario 1 may indicate that a user should be able to access the application and then login by providing appropriate access credentials (e.g., username and password, or other types of access credentials), while the description for the test case associated with scenario 3 may indicate that a user should, once logged in, be prompted to view or modify existing reservations and be able to select an option to view existing reservations. The prerequisite conditions for scenarios 2-4 may indicate that the user must be logged in to the application. The test case for scenario 4 may also specify that the user must have an existing reservation (e.g., so that the functionality for modifying the existing reservation may be verified as operating correctly). The information for the "Step #" field may specify the functionality that is provided by each of the blocks involved in the corresponding scenario and the order in which the functionality is performed (e.g., the blocks are traversed), such as to identify block 212, 216, 222, 224, 226, 228, 230, 220 for scenario 2. The "User Input Type" may specify various actions the user may take (e.g., enter text, click button, etc.) and the "User Input" fields may specify data values that may be used to simulate user interaction with the application, such as including city, state, and country data values for scenario 2 (e.g., for the theatre parameters), and the "Expected Result" field may specify the expected results (e.g., inputting the theatre parameters for scenario 2 results in a theatre being identified and the user being prompted to enter date/time parameters). The attributes (e.g., respective connector/shape information) derived from the specification may be processed using the machine learning logic 118 and/or the text processing logic 119, which may use the attributes to generate expected results in a human readable form. It is noted that the example described above has been provided for purposes of illustration, rather than by way of limitation and that the concepts disclosed herein may be utilized on applications having more complex test cases than those illustrated in the example of FIG. 2. These test cases would then be used to generate machine-readable testing scripts (e.g., executable code written in a programming language or other machine-executable format) for each test case, as described above. It is noted that the term test case, as used herein, is not the same as a testing script. For example, the test case may be a human readable description of a use case (e.g., generated by the text processor processing logic 119 of FIG. 1) while the testing scripts may be written in a programming language, such as visual basic, java, python, JAVA, PYTHON, or another programming language.

Referring back to FIG. 1, once the testing scripts have been generated (and optionally reviewed/edited by a user), the testing device 110 may execute the testing scripts. As an example, the testing scripts may be executed in browser application to test functionality of a web-based application, such as an application accessible from a website. During execution of the testing scripts, the various flows identified in the specification 128 may be tested. For example, to test the log in functionality associated with scenario 1 above, the testing script may navigate to the login page of the application by providing commands to the browser to simulate user activity (e.g., the user typing in the uniform resource locator (URL) for the website, accessing the login input fields and inputting access credentials, etc.). The execution of the testing may be monitored and the results may be recorded to a database (e.g., a database stored at the memory 114 of the testing device 110).

After the testing is complete (or at least after one of the testing scripts is complete), one or more reports including information indicating a result of the test(s) may be generated. The information included in the reports may indicate whether the test was successful, if any errors were encountered, which function encountered an error, the data provided to the application when an error was encountered, or other information. The reports may be accessed by one or more users to allow the users to verify the testing, identify any errors encountered during the testing, or other reasons. By providing details regarding the functions experiencing errors and the data or actions that caused the errors, the user may more easily identify and correct any errors in the application code or the testing scripts. For example, if an error was encountered due to a numerical value being provided with a comma (e.g., 1,000 instead of 1000), the user may modify the application to accept numerical values with commas or to remove commas from numerical values, or may update the testing script to use numerical values without commas. It is noted that this simplistic example is provided for purposes of illustrating the ease of identifying and correcting errors due to the providing of reports on the testing script execution and is not intended to limit the present disclosure.

The machine learning logic 118 may perform various tasks throughout the above-described processes for generating the test cases and test scripts. For example, during the generation of the mapping data, the machine learning logic 118 may be used to map the keywords, data, and functions to the flows, which may result in more testing scripts that more accurately test the functionality of the application or process being tested. The mapping may be performed in an unsupervised manner using a combination of natural language processing (NLP) processes, which may utilize the text processing logic 119, and clustering algorithms to map data (e.g., keywords, data, functions) based on input information (e.g., user action and other criteria derived from the specification. The clustering algorithms may be performed by the machine learning logic 118. Additionally, the machine learning logic 118 may be trained, at least in part, using the reports derived from execution of the testing scripts. For example, the machine learning logic 118 may be trained based on identified errors in the test execution, which may be the result of improper mapping during the testing script generation phase. This may facilitate improvements in the mapping and generation of testing scripts over time, allowing more accurate testing scripts to be achieved in less time. Additionally, while manual review of test cases and testing scripts is optionally provided, the machine learning logic 118 and its ability to learn from each execution of the testing scripts may result in a system that does not require manual review, such as after a threshold number of applications or processes have been tested. In such instances, manual review by a user may still be available but is not necessary due to the increased accuracy of the testing scripts due to the training of the machine learning logic 118. The test results feeds may be processed by the machine learning logic 118 using a machine learning based prediction model configured to capture and/or compare the attributes (e.g., keywords, functions/alias attributes, and test condition(s), respectively) for both successful and unsuccessful test steps and update the prediction model. The generated predictions may then be used to increase the mapping accuracy of attributes (e.g., functions/data/keywords) while generating automation scripts (e.g., in a subsequently executed test script generation process).

In an aspect, portions of the testing process may utilize one or more external or third party tools. For example, the testing may be performed based on a Selenium framework, which is a tool designed to aid in testing web-based applications. When such third party or external tools are utilized, the testing scripts or other portions of the data generated by the testing device 110 may be configured for use with those tools, such as to store generated files (e.g., test cases, testing scripts, etc.) in a particular directory of a device to which the tool(s) is accessible.

As shown above, the system 100 provides a new process for automated creation of testing scripts and test cases for testing applications involving a variety of potential flows. The new processes provided by the system 100 utilize objective and machine learning based techniques to automatically transform a graphical representation of an application or process into a series of testing scripts that are customized to test specific processing flows (e.g., functionality) within the application or process. Additionally, the machine learning techniques are configured to be trained based on results of previous executions of testing scripts, thereby enabling the system 100 to improve the accuracy of generated testing scripts and provide more thorough testing of applications over time (e.g., to the point where manual review of testing scripts is not required). In addition to increasing the accuracy of the testing scripts and the scope of the testing (e.g., ensuring all test cases are tested), the automated testing processes provided by the system 100 significantly reduces the amount of time that is required to perform testing as compared to the subjective and manual techniques presently used. For example, up to an 80% saving in time may be realized by using the system 100 to test an application or process as compared to using the presently available subjective and manual techniques. Other advantages provided by the system 100 and the concepts disclosed herein may also be readily recognized by a person of ordinary skill in the art.

Figure 4:
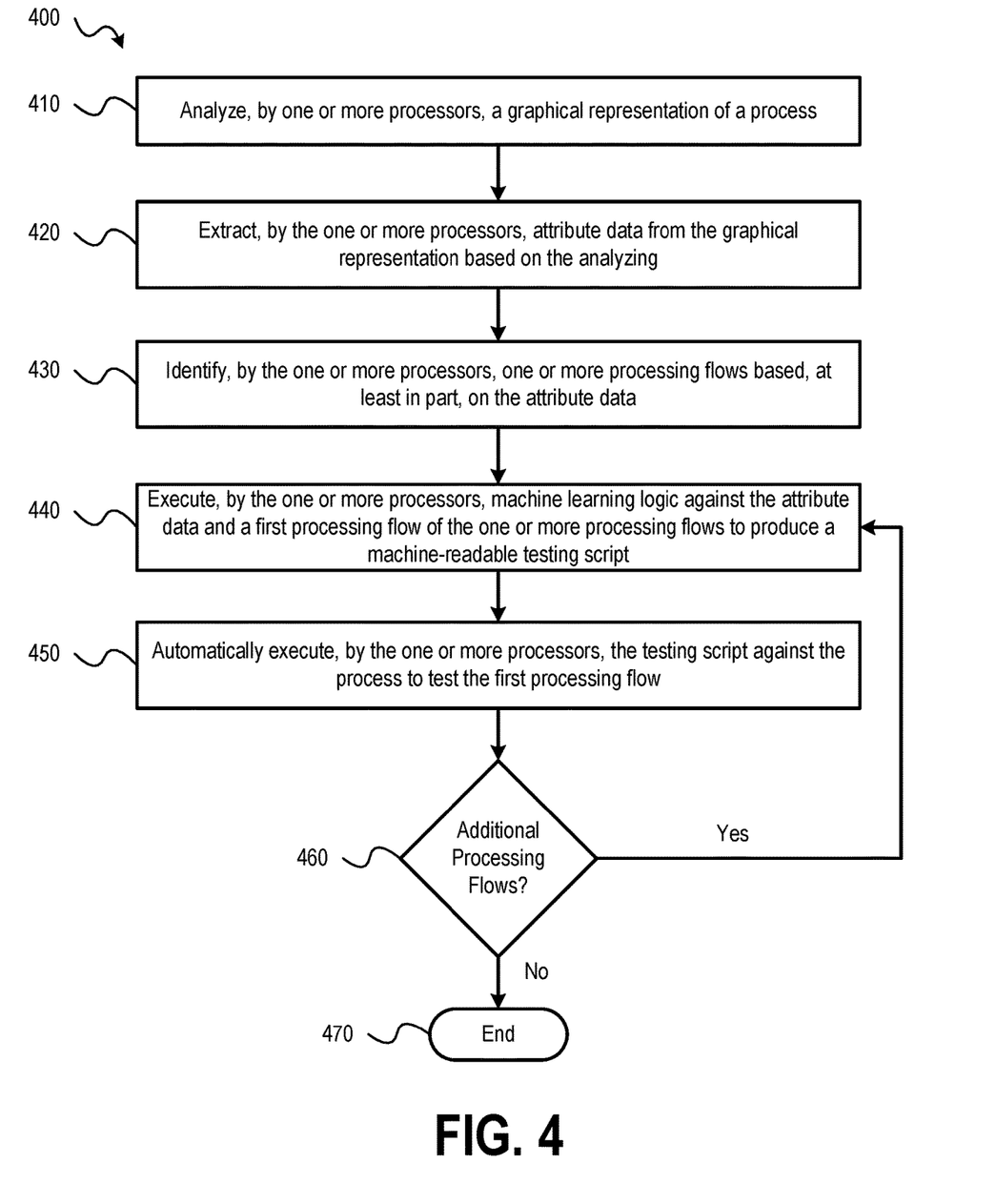
FIG. 4 is a flow diagram illustrating a method for testing an application in accordance with aspects of the present disclosure.

Referring to FIG. 4, a flow diagram illustrating a method for testing an application in accordance with aspects of the present disclosure is shown as a method 400. In aspects, the method 400 may be performed by a device, such as the testing device 110 of FIG. 1. Additionally, the method 400 may be stored as instructions (e.g., the instructions 116 of FIG. 1) that, when executed by one or more processors (e.g., the one or more processors 112 of FIG. 1), cause the one or more processors to perform the steps of the method 400.

At step 410, the method 400 includes analyzing, by one or more processors, a graphical representation of a process. As described above with reference to FIGS. 2 and 3, the graphical representation of the process may include a plurality of shapes and a plurality of connectors. The plurality of connectors may be configured to connect different shapes of the plurality of shapes. In aspects, analyzing the graphical representation may also include determining whether the graphical representation includes any errors, such as if the plurality of connectors includes a connector that is not connected to at least two shapes of the plurality of shapes and/or if the plurality of shapes includes a shape that is not connected to at least one other shape of the plurality of shapes by a connector of the plurality of connectors. If an error is detected, any flows involving the error may be ignored (e.g., until the error is corrected) and no testing scripts may be generated for the ignored processing flows. At step 420, the method 400 includes extracting, by the one or more processors, attribute data from the graphical representation based on the analyzing. The attribute data may identify the plurality of shapes, the plurality of connectors, and connections between different shapes of the plurality of shapes and the plurality of connectors. In an aspect, extracting the attribute data from the graphical representation may include generating a new copy of the graphical representation and adding metadata to the new copy of the graphical representation, where the attribute data is extracted, at least in part, from the new copy of the graphical representation, such as from the metadata.

At step 430, the method 400 includes identifying, by the one or more processors, one or more processing flows based, at least in part, on the attribute data. As described above with reference to FIGS. 1-3, each processing flow of the one or more processing flows may traverse a portion of the graphical representation via a set of connectors of the plurality of connectors that establish connections between a set of shapes of the plurality of shapes, such as the processing flows 1-3 illustrated in FIG. 3. It is noted that some different processing flows may include overlapping or common shapes and connectors (e.g., some of the connectors and shapes may be common to or part of two or more different processing flows), while other different processing flows may include non-overlapping or unique sets of shapes and connectors (e.g., some shapes and connectors may be unique to a specific processing flow and not utilized by other processing flows). At step 440, the method 400 includes executing, by the one or more processors, machine learning logic against the attribute data and a first processing flow of the one or more processing flows to produce a machine-readable testing script. In an aspect, the machine learning logic may be the machine learning logic 118 of FIG. 1. The machine-readable testing script may comprise information written in a programming language, as opposed to human readable or natural language. It is noted that additional machine-readable testing scripts for other processing flows may also be generated, as described above with reference to FIGS. 1-3. Each testing script may be configured to test functionality of a corresponding processing flow. Executing the machine learning logic against the against the attribute data and the first processing flow (or other processing flows) may include mapping a dataset (e.g., the dataset 140 of FIG. 1) to the first processing flow based at least in part on the attribute data, as described above.

At step 450, the method 400 includes automatically executing, by the one or more processors, the machine-readable testing script against the process to test the first processing flow. As described above, the process may be associated with a web-based application and execution of the machine-readable testing script against the process may involve executing the testing script from a web browser or third party tools (e.g., Selenium) to test functionality of the web-based application corresponding to the processing flow associated with the testing script (e.g., the testing script may simulate a user interaction with the web-based application). The testing may be monitored and data indicating results of the testing may recorded (e.g., to a database). In aspect, the data derived during the monitoring may be used to train the machine learning logic, which may improve the accuracy of testing scripts over time, as described above. In addition to training the machine learning logic based on the data obtained during the monitoring, one or more reports may be generated. The report may include information that indicates results of one or more portions of the processes tested during the execution of each of the testing scripts.

At step 460, the method 400 may include determining whether there are additional processing flows for which machine-readable testing scripts are to be executed for testing. If there are additional processing flows and machine-readable testing scripts, the method 400 may proceed to step 440, where the additional machine-readable testing scripts may be generated for the additional processing flows. If there are no more processing flows, the method 400 may terminate at block 470. It is noted that in additional or alternative aspects, a machine readable testing script for a first processing flow may be generated and tested via a first execution of steps 430-450 and then additional machine-readable testing scripts may be generated and executed via a second execution of steps 430-450. In another additional or alternative aspect, machine-readable testing scripts may be generate for each identified processing flow at step 440 and then tested separately as described with reference to step 450. It is noted that testing of machine-readable testing scripts and processing flows may include concurrent testing of different processing flows (e.g., concurrent execution of multiple machine-readable testing scripts, each testing a different processing flow).

In addition to generating and executing testing scripts, the method 400 may also include automatically generating a plurality of test cases. Each test case of the plurality of test cases may correspond to one processing flow of the one or more processing flows and may include a human readable description of the corresponding processing flow. In some embodiments, the human readable description of the processing flows may include information similar to the information shown in Table 1. As described above, the test case for each processing flow may be automatically generated based on the graphical representation.

As shown above, the method 400 provides a new process for automated creation of testing scripts and test cases for testing applications involving a variety of potential processing flows. The method 400 utilizes objective and machine learning based techniques to automatically transform a graphical representation of an application or process into a series of testing scripts that are customized to test specific flows within the application or process. Additionally, the machine learning techniques are configured to be trained based on results of previous executions of testing scripts, thereby enabling the method 400 to improve the accuracy of generated testing scripts and provide more thorough testing of applications over time (e.g., to the point where manual review of testing scripts is not required). In addition to increasing the accuracy of the testing scripts and the scope of the testing (e.g., ensuring all test cases are tested), the automated testing processes provided by the method 400 may significantly reduce the amount of time that is required to perform testing as compared to the subjective and manual techniques presently used. For example, up to an 80% saving in time may be realized by using the system 100 to test an application or process as compared to using the presently available subjective and manual techniques. Other advantages provided by the method 400 and the concepts disclosed herein may also be readily recognized by a person of ordinary skill in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4) may comprise processors, electronics devices, hardware devices, electronics components, logical circuits, memories, software codes, firmware codes, etc., or any combination thereof. In addition, features discussed herein relating to FIGS. 1-4 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
analyzing, by one or more processors, a graphical representation of a process,
wherein the graphical representation of the process comprises a plurality of shapes and a plurality of connectors, and
wherein the plurality of connectors are configured to connect different shapes of the plurality of shapes;
extracting, by the one or more processors, attribute data from the graphical representation based on the analyzing,
wherein the attribute data identifies:
the plurality of shapes,
the plurality of connectors, and
connections between different shapes of the plurality of shapes and the plurality of connectors;
identifying, by the one or more processors, one or more processing flows within the process based, at least in part, on the attribute data,
wherein each processing flow of the one or more processing flows traverses a portion of the graphical representation via a first set of connectors of the plurality of connectors that establish connections between a first set of shapes of the plurality of shapes;
executing, by the one or more processors, machine learning logic against a portion of the attribute data corresponding to a first processing flow of the one or more processing flows within the process to produce a machine-readable testing script,
wherein the machine learning logic is configured to receive the portion of the attribute data corresponding to the first processing flow as input and to output mapping data that indicates a mapping of entries in a stored dataset to the first processing flow, the entries in the stored dataset identifying functions provided by processes under test, data values that simulate interaction with the processes under test, keywords that identify portions of the processes under test, or a combination thereof,
wherein the machine-readable testing script is produced based on the entries indicated by the mapping data, and
wherein the machine-readable testing script is configured to test functionality of the first processing flow; and
automatically executing, by the one or more processors, the machine-readable testing script against the process to test the first processing flow.

2. The method of claim 1, further comprising:
analyzing the graphical representation to determine whether the plurality of connectors includes a connector that is not connected to at least two shapes of the plurality of shapes; and
detecting an error based on the analyzing,
wherein the error indicates that the process includes a connector that is not connected to at least two shapes of the plurality of shapes.

3. The method of claim 1, further comprising:
analyzing the graphical representation to determine whether the plurality of shapes includes a shape that is not connected to at least one other shape of the plurality of shapes by a connector of the plurality of connectors; and
detecting an error based on the analyzing,
wherein the error indicates that the process includes a shape that is not connected to at least one other shape of the plurality of shapes by a connector of the plurality of connectors.

4. The method of claim 1, further comprising:
monitoring execution of the machine-readable testing script against the process; and
generating report data based on the monitoring,
wherein the report data includes information indicating results of one or more portions of the process tested during the execution of the machine-readable testing script.

5. The method of claim 4, further comprising training the machine learning logic based on the report data.

6. The method of claim 1, wherein the process is a web-based application and the machine-readable testing script is executed to simulate a user interaction with the web-based application.

7. The method of claim 1, wherein:
the entries mapped to the first processing flow identify one or more functions provided by the first process flow, one or more data values that simulate interaction with the first process flow, one or more keywords corresponding to the first processing flow, or a combination thereof, and
the machine-readable testing script includes the one or more functions, the one or more data values, the one or more keywords, or a combination thereof.

8. The method of claim 1, further comprising automatically generating a plurality of test cases, each test case of the plurality of test cases corresponding to one processing flow of the one or more processing flows,
wherein the test case for each processing flow comprises a human readable description of the corresponding processing flow.

9. The method of claim 1, further comprising automatically generating a plurality of test cases, each test case of the plurality of test cases corresponding to one processing flow of the one or more processing flows,
wherein the test case for each processing flow is automatically generated based on the graphical representation.

10. The method of claim 1, further comprising generating a new copy of the graphical representation and adding metadata to the new copy of the graphical representation, wherein the attribute data is extracted, at least in part, from the new copy of the graphical representation.

11. The method of claim 1, wherein the machine learning logic is trained to perform the mapping of the entries to the first processing flow based on natural language processing (NLP) operations and clustering.

12. The method of claim 1, further comprising:
automatically executing, by the one or more processors, multiple machine-readable testing scripts against multiple corresponding processing flows to generate test results;
training, by the one or more processors, a machine learning predictor to predict successful testing script steps based on the test results; and
further training, by the one or more processors, the machine learning logic based on an output of the machine learning predictor.

13. The method of claim 12, further comprising training, by the one or more processors, the machine learning predictor based on attributes of successful testing script steps and attributes of unsuccessful testing script steps.

14. A non-transitory computer-readable storage medium storing instructions that, when executed by one or more processors, cause the one or more processors to perform operations for automatically testing a process, the operations comprising:
analyzing a graphical representation of a process,
wherein the graphical representation of the process comprises a plurality of shapes and a plurality of connectors, and
wherein the plurality of connectors are configured to connect different shapes of the plurality of shapes;
extracting attribute data from the graphical representation based on the analyzing,
wherein the attribute data identifies the plurality of shapes, the plurality of connectors, and connections between different shapes of the plurality of shapes and the plurality of connectors;
identifying one or more processing flows within the process based, at least in part, on the attribute data,
wherein each processing flow of the one or more processing flows traverses a portion of the graphical representation via a first set of connectors of the plurality of connectors that establish connections between a first set of shapes of the plurality of shapes;
executing machine learning logic against a portion of the attribute data corresponding to a first processing flow of the one or more processing flows within the process to produce a machine-readable testing script,
wherein the machine learning logic is configured to receive the portion of the attribute data corresponding to the first processing flow as input and to output mapping data that indicates a mapping of entries in a stored dataset to the first processing flow, the entries in the stored dataset identifying functions provided by processes under test, data values that simulate interaction with the processes under test, keywords that identify portions of the processes under test, or a combination thereof, wherein the machine-readable testing script is produced based on the entries indicated by the mapping data, and wherein the machine-readable testing script is configured to test functionality of the first processing flow; and automatically executing the machine-readable testing script against the process to test the first processing flow.

15. The non-transitory computer-readable storage medium of claim 14, the operations further comprising:

analyzing the graphical representation to determine whether the plurality of connectors includes a connector that is not connected to at least two shapes of the plurality of shapes and to determine whether the plurality of shapes includes a shape that is not connected to at least one other shape of the plurality of shapes by a connector of the plurality of connectors; and detecting an error based on the analyzing, wherein the error indicates that the process includes a connector that is not connected to at least two shapes of the plurality of shapes, a shape that is not connected to at least one other shape of the plurality of shapes by a connector of the plurality of connectors, or both.

16. The non-transitory computer-readable storage medium of claim 14, the operations further comprising:

monitoring execution of the machine-readable testing script against the process;

generating data based on the monitoring, wherein the data includes information indicating results of one or more portions of the processes tested during the execution of the machine-readable testing script; and training the machine learning logic based on the data generated based on the monitoring.

17. The non-transitory computer-readable storage medium of claim 14, wherein the entries mapped to the first processing flow identify one or more functions provided by the first process flow, one or more data values that simulate interaction with the first process flow, and one or more keywords corresponding to the first processing flow.

18. The non-transitory computer-readable storage medium of claim 14, the operations further comprising automatically generating a plurality of test cases, each test case of the plurality of test cases corresponding to one processing flow of the one or more processing flows, wherein the test case for each processing flow comprises a human readable description of the corresponding processing flow, and wherein the test case for each processing flow is automatically generated based on the graphical representation.

19. A system for testing a process, the system comprising:

a memory; and one or more processors communicatively coupled to the memory, the one or more processors configured to:

analyze a graphical representation of a process, wherein the graphical representation of the process comprises a plurality of shapes and a plurality of connectors, and wherein the plurality of connectors are configured to connect different shapes of the plurality of shapes;

extract attribute data from the graphical representation based on the analyzing, wherein the attribute data identifies the plurality of shapes, the plurality of connectors, and connections between different shapes of the plurality of shapes and the plurality of connectors;

identify one or more processing flows within the process based, at least in part, on the attribute data, wherein each processing flow of the one or more processing flows traverses a portion of the graphical representation via a first set of connectors of the plurality of connectors that establish connections between a first set of shapes of the plurality of shapes;

execute machine learning logic against a portion of the attribute data corresponding to a first processing flow of the one or more processing flows within the process to produce a machine-readable testing script, wherein the machine learning logic is configured to receive the portion of the attribute data corresponding to the first processing flow as input and to output mapping data that indicates a mapping of entries in a stored dataset to the first processing flow, the entries in the stored dataset identifying functions provided by processes under test, data values that simulate interaction with the processes under test, keywords that identify portions of the processes under test, or a combination thereof, wherein the machine-readable testing script is produced based on the entries indicated by the mapping data, and wherein the machine-readable testing script is configured to test functionality of the first processing flow; and automatically execute the machine-readable testing script against the process to test the first processing flow.

20. The system of claim 19, wherein the one or more processing flows comprises a plurality of processing flows, the plurality of processing flows including the first processing flow, and wherein the one or more processors are configured to:

generate additional machine-readable testing scripts for other processing flows of the plurality of processing flows; and automatically execute the additional machine-readable testing scripts against the process to test the other processing flows.

* * * * *

UNITED STATES PATENT AND TRADEMARK OFFICE
CERTIFICATE OF CORRECTION

| | |
|---|---|
| PATENT NO. | : 11,580,012 B2 |
| APPLICATION NO. | : 16/923073 |
| DATED | : February 14, 2023 |
| INVENTOR(S) | : Rajitha Challa et al. |

It is certified that error appears in the above-identified patent and that said Letters Patent is hereby corrected as shown below:

In the Specification

At Column 15, beginning at Line number 18, delete "text processor processing logic 119" and replace with --text processing logic 119--.
At Column 15, Line number 21, delete "java, python, JAVA, PYTHON" and replace with --JAVA, PYTHON--.

Signed and Sealed this
Twenty-eighth Day of March, 2023

Katherine Kelly Vidal
*Director of the United States Patent and Trademark Office*